Sept. 1, 1925.

A. KREBS 1,552,061

OPERATING MEANS FOR TOOLS

Filed Oct. 24, 1921

Inventor
Dr Adolf Krebs.

Sept. 1, 1925. 1,552,061
A. KREBS
OPERATING MEANS FOR TOOLS
Filed Oct. 24, 1921  2 Sheets-Sheet 2

Inventor
Adolf Krebs

Patented Sept. 1, 1925.

1,552,061

UNITED STATES PATENT OFFICE.

ADOLF KREBS, OF BOSTON, MASSACHUSETTS.

OPERATING MEANS FOR TOOLS.

Application filed October 24, 1921. Serial No. 510,085.

*To all whom it may concern:*

Be it known that I, ADOLF KREBS, a citizen of Germany, residing at Boston, in the county of Suffolk and State of Massachusetts, have invented certain Improvements in Operating Means for Tools, of which the following description, in connection with the accompanying drawings, is a specification, like reference characters on the drawings indicating like parts in the several figures.

This invention relates to mechanical means for propelling a tool along straight, curved, or irregularly-shaped paths at uniform speed.

In the prior art there is disclosed an apparatus for moving a torch along a pattern which comprises a magnetic tracer that serves also as the driving or propelling means for the torch. There is a seeming simplicity about the apparatus that is entirely misleading. This will be clear when it is understood that besides the motor circuit for the electric motor drive there is provided also an electric circuit for the magnetic tracer. Since the magnetic tracer is depended upon to control the direction of movement of the torch by adhering closely to the pattern, it cannot be made very small, it being understood that the force of magnetic attraction lessens with the decrease in the size of the tracer. Hence below a certain size the tracer would fail to function properly. There are serious disadvantages which arise from the fact that the magnetic tracer cannot be made small enough to follow accurately all the turns in the path such, for example, as those provided by reentrant angles in certain kinds of patterns and in various classes of work. Most serious of all, and a fatal defect with respect to certains kinds of work, the torch carrying apparatus may come to a stop at a turn or angle in the path. It is a distinct drawback that the rate of movement of the apparatus is variable and uncertain.

It is an object of this invention to provide a mechanical means of the character described which will be simple and durable in construction, especially efficient in operation, and free from the deficiencies and disadvantages which have been inherent in prior constructions.

In one aspect the invention resides in a tracer adapted to follow the outline of a pattern or other path of predetermined shape with absolute accuracy. In a practical form of the invention the driving or propelling means operates also to hold the tracer in contact with the guiding wall of the path.

In another aspect the invention comprises a tracer and a driving or propelling means so constructed and arranged as to react on each other to ensure accuracy in following a predetermined path and uniformity in the rate of movements along the path.

When, as in prior constructions, a magnetic tracer is employed to serve both as a tracer and as a propelling means, the pattern must necessarily be of magnetic material. In accordance with the present invention the pattern may be made of such non-magnetic material as fibre or wood. Because of this fact many patterns can be provided at low cost, without reducing the efficiency of the machine.

Other features of the invention and other novel combinations of parts will be described in the specification and pointed out in the appended claims.

Figure 1:
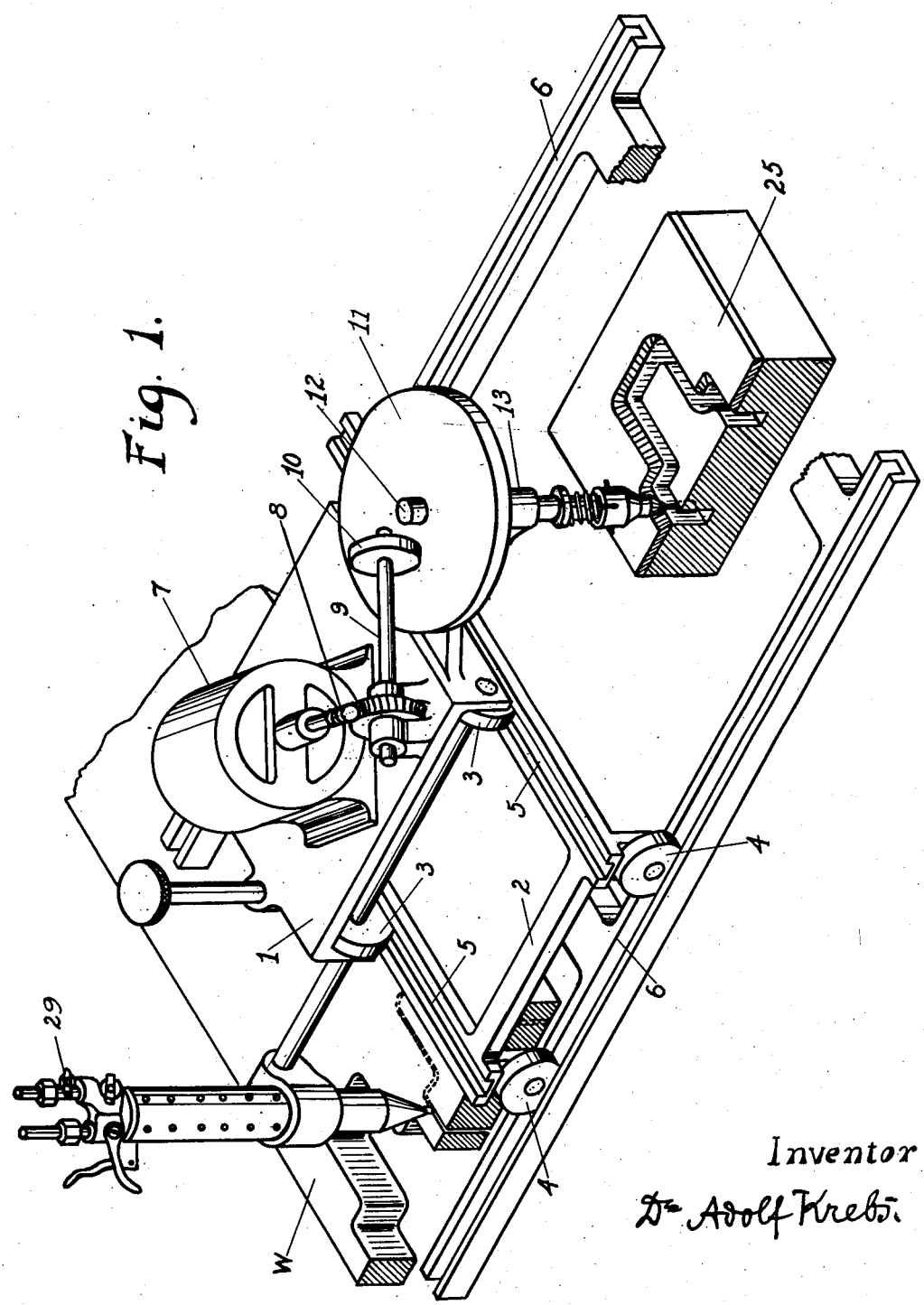
Fig. 1 is a perspective view of an apparatus embodying the invention.

The invention is applied in the illustrative construction to automatic apparatus for cutting metals by means of gases and in accordance with any desired design or template. The novel features of the invention are, however, applicable to machines for operating not only cutting torches but also gas or electric welding torches or appliances which should be propelled along the desired lines with uniform speed.

The working tool, a gas torch 29 in the constructions shown, is secured rigidly to the upper carriage 1 of a universal double carriage. This double carriage consists of the upper carriage 1 provided with the four wheels 3 and a lower carriage 2 also provided with four wheels 4. The wheels 3 and 4 have substantially flat rims and run in grooves or channels of rectangular section formed in tracks 5 and 6 respectively, extending at right angles to each other.

On the side of the upper carriage 1 opposite to the side which carries the torch 29, there is rigidly supported a tracing device which compels the carriage and the torch to travel in a predetermined path. The upper surface of the carriage supports a small electric motor 7 which rotates a shaft 9 by means of a worm and wheel drive 8. The outer end of the shaft 9 carries a friction wheel 10 engaging a friction disk 11. A shaft 12 suspended from the friction disk 11 extends through a bearing 13 formed in a rigid bracket carried by the upper carriage. The upper surface of the bearing bracket has an annular groove forming a bearing for steel balls $b$ so as to provide a broad and easy turning support for the disk 11. The shaft 12 carries the driving mechanism which causes the tool to follow a definite path. The shaft 12 is provided with two or four driving pins 15 which are received in slots 16 of a driving roll 17 permitting axial movement of the latter relative to the shaft. A spring 19 surrounding the shaft 12 tends to force the driving roll 17 against the beveled bearing face 18 of a template 25. The tension of the spring 19 can be regulated by means of a set screw 21 and a collar 20 surrounding the shaft 12. The end $c$ of the driving roll 17 is of conical shape and preferably knurled to ensure a frictional driving engagement with the beveled face 18.

Figure 2:
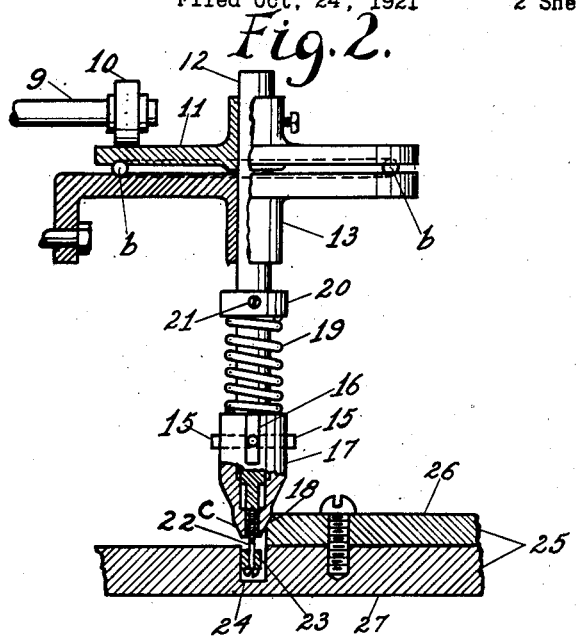
Fig. 2 is a detail section of the new driving mechanism designed to propel the tracer around a template.
Figure 3:
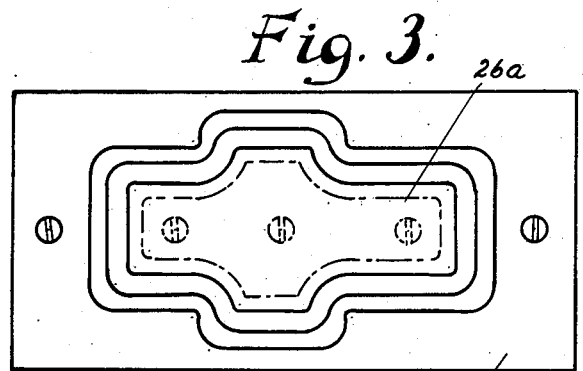
Fig. 3 is a top view of the template.

A pin 22 is screwed into the lower end of the shaft 12 and extends through the driving member 17 into a tracing groove 24 of the template 25. The lower end of the pin carries an anti-friction roller 23 which fits loosely into the groove 24. When the shaft 12 is rotated the driving member will travel along the bearing face 18 which lies in a plane above that of the walls of the groove proper, and the roller 23 will not only assist in guiding the driving roll along the desired path but will also keep it in constant engagement with the bearing face 18 and insure uniform speed thereof. Figure 2 illustrates the manner in which the spring 19 acts upon the driving member 17. It should be noted that the conical face $c$ of the driving member has a tendency to slide downwardly on the face 18. This tendency causes the roller 23 to hug the inner wall or the wall of the groove 24 opposite to the face 18. This arrangement has the advantage that lost motion between the driving member and tracer and the template is eliminated yet ample clearance is provided between the roller 23 and the other wall of the groove 24 so that binding of the roll within the groove is effectively avoided.

The tracing roller 23 is shown to be of a comparatively small diameter so that it can follow even most intricate designs characterized by small curves, sharp edges or sudden turns. Since the roller 23 has no driving function it may consist of a highly polished anti-friction roller which glides smoothly within the groove 24 ensuring accurate and uniform travel of the tool. Furthermore, it should be noted that the lower end of the tracing roller 23 is so arranged as not to engage under any circumstances the bottom of the groove 24, thus avoiding excessive friction of the roller within the groove.

Figure 4:
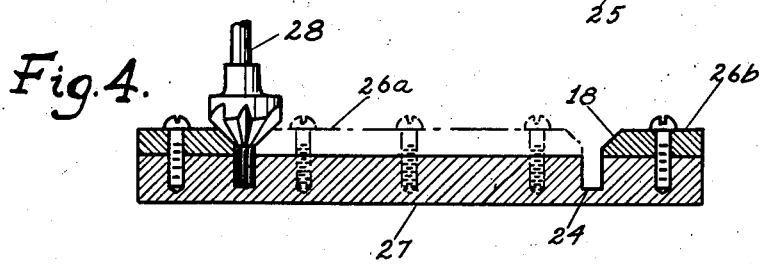
Fig. 4 illustrates the manner in which the template is manufactured.

Since it is unnecessary to magnetize the tracer or the template 25, as in certain prior constructions, it can be made of non-magnetic material such as cardboard, indurated fibre, lead or the like. Plates or boards 26, 27 of the desired thickness are screwed together as shown in Figure 4 and then a sketch of the desired path of the tool is pasted on top of the upper plate 26, or the design may be drawn directly upon the upper face of this plate. A milling tool 28 of proper design is then used simultaneously to produce a beveled face 18 and to cut the groove 24. After the face 18 and the groove 24 have been provided, the part 26$^a$ or 26$^b$ of the upper plate, whichever is not needed, is removed so that the driving member can act in the manner illustrated in Figure 2. In order to insure smooth co-operation of the driving roller 23 with the groove 24, the latter can be and preferably is polished after it has been cut. The use of relatively soft material such as indurated fibre reduces both the cost of material and labor in manufacturing the template.

The new arrangement presents numerous advantages. The tracer itself is not utilized as a driving member and operates in a different plane from that of the driving member, the construction being preferably such that there is an interaction between the tracer and driving member to hold each in firm contact with its guiding or bearing surface. As shown the driving member runs on an incined surface, the spring 19 serving to absorb the vibrations of the driving member while yieldingly maintaining both the tracer 23 and driving member 17 in contact with their respective guiding surfaces. Since the driving member is pressed with considerable force against the face 17 by the spring 19, it is effective and entirely satisfactory as a propelling means. The tracing member will always be driven at a uniform speed, even when traversing corners.

A particular advantage arising from the construction above described results from the employment of rigid inextensible connections between the tracer and torch so that no lost motion can possibly be introduced between these parts and the most minute movements of the tracer must be partaken of by the torch.

This construction thus possesses a marked advantage over similar devices which depend upon a magnetic tracer as a driving member since the latter is uncertain and variable in operation and may even fail to operate at abrupt turns in the path.

It is believed that the construction and mode of operation of the illustrative machine has been set forth with sufficient clearness in the foregoing description and that recapitulation is unnecessary.

What I claim and desire to secure by Letters Patent of the United States is:—

1. A machine of the class described comprising a template following element, means for moving said element along a template, a blow torch having its axis substantially parallel with the axis of said element, and means rigidly interconnecting said element and torch to prevent relative movement of said parts whereby the torch is caused to describe a path accurately conforming to the contour of the template.

2. A machine for working material by the agency of heat comprising a blow torch having its axis arranged vertically when in operative position, a template engaging guide arranged parallel to the axis of the blow torch, a rigid carriage having means for supporting said torch and guide at a substantially fixed distance apart, and means for imparting relative movement to the carriage and work in a horizontal plane.

3. A machine of the class described comprising a rigid carriage movable universally in a horizontal plane, a blow torch mounted upon the carriage, a template engaging member also mounted upon the carriage, the axes of the torch and template engaging member being vertical and being spaced apart a constant distance during operation, and means for moving the carriage whereby to cause the template engaging member to follow the contour of a guiding template.

4. A machine of the class described comprising a supporting frame having a pair of parallel guide rails thereon, a rigid carriage supported for bodily movement along said rails, a second carriage mounted upon the first carriage and movable relatively thereto and in a direction transverse of the length of said rails, a thermal metal-working instrumentality supported by said second carriage adjacent to one side thereof, a motor, and a motor driven shaft supported adjacent to the opposite side of the carriage and arranged to cause the second carriage to move in a predetermined path.

5. A machine of the class described comprising a carriage having wheels, grooved rails for supporting and guiding said wheels, means for supporting said rails for bodily movement in a direction at right angles to their lengths, a blow torch mounted upon the carriage, a motor also mounted upon the carriage, and means actuated by the motor for imparting movement to the carriage.

6. A machine of the class described comprising a wheeled carriage, means supporting said carriage for accurate bodily movement in a given direction, means for accurately guiding said supporting means for movement in a direction at right angles to the direction of movement of the carriage, a thermal cutting implement mounted upon the carriage, a shaft mounted in bearings in the carriage and extending in a direction substantially perpendicular to the plane of movement of the carriage, a roll fixed to the shaft and engageable with a template, and a motor mounted upon the carriage for rotating the shaft.

7. A machine of the class described comprising a rigid carriage mounted for universal movement in a given plane, a motor secured to the carriage, a shaft mounted in bearings supported by the carriage, a disc fast to the shaft, a second shaft having a roll engaging said disc and serving to rotate the latter, connections between the motor and said second shaft, and a driving roll secured to the first shaft and engageable with a fixed template.

8. In combination in a machine of the class described, a template having opposed guide surfaces, one of the surfaces being beveled, tool guiding mechanism having a roller engaging the beveled surface and a guide engaging the other surface, and means for yieldingly urging the roller and guide against their respective surfaces.

9. In combination in a machine of the class described, a template having opposed guide surfaces, one of the surfaces being beveled, tool guiding mechanism having a roller engaging the beveled surface and a guide engaging the other surface, the roller and guide being relatively movable, and means common to the roller and guide for yieldingly urging them against their respective surfaces.

10. A machine of the class described comprising tool guiding mechanism having a drive shaft, a guide arranged to engage a template surface for guiding the mechanism along a predetermined path, a drive roller having a surface engageable with another template surface for propelling the mechanism along said path, one of said last two surfaces being tapered longitudinally of said shaft in such direction that axial pressure between the two surfaces urges the guide against said first template surface.

11. A machine of the class described comprising tool guiding mechanism having a propeller shaft, a guide engageable with a template surface to restrict movement of the mechanism in one direction, and a drive roller on said shaft engageable with a template surface offset relatively to the first surface longitudinally of the shaft for restricting movement of the mechanism in the opposite direction.

12. In combination in a machine of the class described having a movable tool carriage, a shaft journaled in the carriage, a roller secured to the shaft for rotation therewith and for axial movement, a template having a surface engageable by said roller, and resilient means normally operative for yieldingly urging the roller axially into engagement with the template surface.

13. A machine of the class described comprising a movable carriage, a rotary shaft carried thereby, a template engaging roll connected to the shaft for rotation therewith but to slide longitudinally thereof, and a spring for urging said roll longitudinally of the shaft.

14. In combination in a machine of the class described, a movable carriage and means for moving said carriage in a predetermined path comprising a shaft, a roll mounted thereon and movable in an axial direction, said roll having a beveled, peripheral face, a template having a beveled surface, and means constantly urging said roll in an axial direction whereby to cause its beveled face to engage said beveled surface of the template.

15. A machine of the class described comprising a rigid, movable carriage, a shaft journaled therein, means for rotating the shaft, a roll having a beveled peripheral face for engagement with a corresponding beveled template surface, said roll being connected to the shaft for axial movement relatively thereto, a collar fixed to the shaft, and a spring reacting oppositely against the collar and roll for urging the latter axially along the shaft.

16. A machine of the class described comprising a rotary shaft having a roll mounted thereon for rotation therewith, said roll having a surface for engagement with a template surface, and an element coaxial with the shaft for engagement with an opposing template surface.

17. A machine of the class described having a horizontally movable tool carriage, a vertical shaft mounted upon the carriage, means providing a template engaging roll adjacent to the lower end of the shaft, and additional template engaging means carried by the shaft below the roller.

18. A machine of the class described having a rigid horizontally movable tool carriage, a vertical shaft mounted upon the carriage, a pair of template engaging members carried by the shaft and engageable respectively with spaced, template elements, and means normally operative to urge said members into engagement respectively with said elements.

19. In combination in a machine of the class described having a universally movable carriage for supporting a thermal cutting instrumentality, means for imparting movement to the carriage comprising a motor driven shaft journaled in the carriage, a conical roller splined to the shaft for movement axially thereof, a guiding member coaxial with the roller, and a template having surfaces engageable by said roller, and guiding member respectively.

20. A machine of the class described having a movable carriage, a rotary shaft journaled therein, axially movable means rotating with the shaft and having a beveled surface for engagement with a corresponding beveled wall surface of a template groove, guide means carried by the shaft and engageable with the opposite wall of such groove, and means normally urging said movable means axially of the shaft to ensure contact of the guide means with the wall of the groove.

21. In combination in a machine of the class described having a movable tool carriage and a drive shaft therefor, a drive roll rotating with the shaft, a guide element carried by the shaft, said guide element being of a diameter relatively small as compared with that of the roll, and a template having a groove whose opposite walls are constructed and arranged for simultaneous engagement by said roll and guide element respectively.

22. In combination with a machine of the class described, a movable carriage and a drive shaft therefor, a template having a groove, one side wall of which is higher than the other, the higher side being provided with a beveled face, a drive roll mounted upon the shaft, said roll being of a diameter greater than the width of the groove and having a beveled surface engageable with the beveled face of the groove, and a guide element projecting into the groove and engageable with the lower wall thereof, said guide element being of a diameter relatively small as compared with that of the roll.

23. In combination with a machine of the class described having a movable carriage, a driven shaft mounted upon the carriage, and a template cooperable with an element carried by the shaft, said template having a groove, one side wall of which is higher than the opposite wall.

24. In combination in a machine of the class described having a movable tool carriage, a drive shaft for said carriage provided with spaced, template engaging elements, and a template having a groove whose opposite side walls are of different heights, one of said elements engaging one wall of the groove, and the other element engaging the opposite wall thereof.

25. In combination in a machine of the class described, a rigid tool carriage mounted for universal movement in a horizontal plane upon anti-friction bearings, and supported independently of the work to be operated on, and means, including a non-metallic template, for moving said carriage in a predetermined path.

26. In combination in a machine having a rigid carriage for a thermal implement, anti-friction means for supporting said carriage for universal movement in a horizontal plane, and a template of a material relatively soft as compared with steel for controlling the path of movement of said carriage.

27. In combination in a machine of the class described, a rigid carriage, a thermal implement thereon, anti-friction means supporting said carriage for universal movement in a horizontal plane, means for imparting movement to the carriage including a template engaging guide member of small diameter, and a template of indurated fiber having a guide groove for engagement with said guide member for determining the path of movement of the carriage.

28. A template for use with automatic machines of the class described, said template having a pattern groove therein, the inner wall of such groove being of less height than the outer wall thereof.

29. A non-metallic template for use with automatic machines of the class described, said template having a pattern groove therein, one wall of said groove being higher than the opposite wall and having a beveled surface.

In testimony whereof I have signed my name to this specification.

Dr. ADOLF KREBS.